(12) United States Patent
Jaiswal et al.

(10) Patent No.: US 9,996,404 B2
(45) Date of Patent: Jun. 12, 2018

(54) MESSAGE CACHE MANAGEMENT FOR MESSAGE QUEUES

(71) Applicant: Oracle International Corporation, Redwood Shores, CA (US)

(72) Inventors: Mukesh Jaiswal, Bangalore (IN); Shubha Bose, Bangalore (IN); James W. Stamos, Saratoga, CA (US); Alan R. Downing, Fremont, CA (US); Devendra Singh, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 86 days.

(21) Appl. No.: 15/254,278

(22) Filed: Sep. 1, 2016

(65) Prior Publication Data

US 2018/0060145 A1 Mar. 1, 2018

(51) Int. Cl.
| | |
|---|---|
| *G06F 3/00* | (2006.01) |
| *G06F 9/44* | (2018.01) |
| *G06F 9/48* | (2006.01) |
| *G06F 13/00* | (2006.01) |
| *G06F 9/54* | (2006.01) |
| *G06F 12/0875* | (2016.01) |

(52) U.S. Cl.
CPC .......... *G06F 9/546* (2013.01); *G06F 12/0875* (2013.01); *G06F 2212/453* (2013.01)

(58) Field of Classification Search
None
See application file for complete search history.

(56) References Cited

U.S. PATENT DOCUMENTS

| | | |
|---|---|---|
| 8,037,024 B1 | 10/2011 | Bozkaya |
| 8,489,820 B1 | 7/2013 | Ellard |
| 8,959,067 B1 | 2/2015 | Patiejunas |
| 2002/0099697 A1 | 7/2002 | Jensen-Grey |
| 2002/0186656 A1 | 12/2002 | Vu |
| 2006/0069605 A1 | 3/2006 | Hatoun |
| 2006/0218560 A1 | 9/2006 | Dadiomov et al. |
| 2007/0101341 A1 | 5/2007 | Dowing |

(Continued)

OTHER PUBLICATIONS

Jaiswal, U.S. Appl. No. 14/095,734, filed Dec. 3, 2013, Interview Summary, dated Mar. 2, 2017.

(Continued)

*Primary Examiner* — Chat Do
*Assistant Examiner* — William C Wood
(74) *Attorney, Agent, or Firm* — Hickman Palermo Becker Bingham LLP

(57) ABSTRACT

A method and apparatus for message cache management for message queues is provided. A plurality of messages from a plurality of enqueuers are enqueued in a queue comprising one or more shards, each shard comprising one or more subshards. A message cache is maintained in memory. Enqueuing a message includes enqueuing the message in a current subshard of a particular shard, which includes storing the message in a cached subshard corresponding to the current subshard of the particular shard. For each dequeuer-shard pair, a dequeue rate is determined. Estimated access time data is generated that includes an earliest estimated access time for each of a plurality of subshards based on the dequeuer-shard pair dequeue rates. A set of subshards is determined for storing as cached subshards in the message cache based on the earliest estimated access times for the plurality of subshards.

20 Claims, 10 Drawing Sheets

(56) References Cited

U.S. PATENT DOCUMENTS

| | | |
|---|---|---|
| 2009/0133023 A1 | 5/2009 | Li |
| 2010/0198920 A1 | 8/2010 | Wong |
| 2010/0281491 A1 | 11/2010 | Surlaker |
| 2011/0099233 A1 | 4/2011 | Calder |
| 2011/0202929 A1 | 8/2011 | Schleimer |
| 2014/0040040 A1 | 2/2014 | Townsend |
| 2014/0067940 A1 | 3/2014 | Li |
| 2014/0372486 A1 | 12/2014 | Bose et al. |
| 2014/0372489 A1 | 12/2014 | Jaiswal et al. |
| 2014/0372702 A1 | 12/2014 | Subramanyan et al. |
| 2015/0121048 A1 | 4/2015 | Lukefahr et al. |
| 2016/0142510 A1 | 5/2016 | Westphal et al. |

OTHER PUBLICATIONS

Jaiswal, U.S. Appl. No. 14/095,734, filed Dec. 3, 2013, Adviosry Action, dated Mar. 9, 2017.

Bose, U.S. Appl. No. 14/095,543, filed Dec. 3, 2013, Interview Summary, dated Feb. 27, 2017.

Vojin G. Oklobdzija, "Chapter 17.5—Limitations of Simple Prefectching and Caching Strategies", Digital Systems and Applications, dated Nov. 26, 2007, CRC Press, 1 page.

U.S. Appl. No. 14/165,974, filed Jan. 28, 2014, Office Action, dated Jan. 15, 2016.

U.S. Appl. No. 14/165,974, filed Jan. 28, 2014, Notice of Allowance, dated Jul. 1, 2016.

U.S. Appl. No. 14/0965,734, filed Dec. 3, 2013, Final Office Action, dated Mar. 4, 2016.

U.S. Appl. No. 14/095,734, filed Dec. 3, 2013, Office Action, dated Jul. 15, 2016.

U.S. Appl. No. 14/095,734, filed Dec. 3, 2013, Interview Summary, dated Apr. 19, 2016.

U.S. Appl. No. 14/095,543; filed Dec. 3, 2013, Office Action, dated Jan. 4, 2016.

U.S. Appl. No. 14/095,543, filed Dec. 3, 2013, Final Office Action, dated Apr. 20, 2016.

Sugumar et al., "Efficient Simulation of Caches Under Optimal Replacement with Applications to Miss Characterization", dated 1992, 22 pages.

Kejser, Thomas, "Table Pattern: Database Message Queues", dated May 25, 2012, 10 pages.

Belady L.A., "A Study of Replacement Algorithms for a Virtrual-Storage Computer", IBM Systems Journal, vol. 5, No. 2, dated 1966, 24 pages.

Jaiswal, U.S. Appl. No. 14/095,734, filed Dec. 3, 2013, Notice of Allowance, dated May 26, 2017.

Bose, U.S. Appl. No. 14/095,543, filed Dec. 3, 2013, Notice of Allowance, dated Jun. 12, 2017.

MESSAGE CACHE MANAGEMENT FOR MESSAGE QUEUES

FIELD

Embodiments described herein relate generally to queues, and more specifically, to techniques for message cache management for message queues.

BACKGROUND

In many applications, it is necessary for one process executing on a computer system to communicate with one or more other processes executing on the same or other computer systems. The mechanism used to carry out these communications varies from system to system. One mechanism that has facilitated process-to-process communication in a variety of systems is a message queue. Processes send information to other processes by enqueuing messages in the message queue. The receiving processes obtain the information by dequeuing the messages from the message queue. Typically, these messages are read in a first-in first-out manner. Implementations of message queues are described in U.S. Pat. No. 7,181,482, U.S. Pat. No. 7,185,033, U.S. Pat. No. 7,185,034, U.S. Pat. No. 7,203,706, U.S. Pat. No. 7,779,418, U.S. Pat. No. 7,818,386, U.S. Pat. No. 7,680,793, U.S. Pat. No. 6,058,389, and U.S. Pat. No. 8,397,244, the contents of which are incorporated herein by reference in their entirety.

A message queue may be implemented in memory or on secondary storage, such as a magnetic disk, optical disk, or solid-state drive, or any other persistent secondary storage. An in-memory message queue allows queue operations to take place in memory, thereby reducing I/O latency. However, memory is generally a more limited resource. Thus, it may not always be assumed that a message queue can be completely implemented in memory.

An in-memory message cache that is backed by secondary storage may be used to store at least a portion of the messages in the message queue in memory. For example, database-backed queues may be architected to handle extremely large queues, even when aggregate queue size is many times larger than the size of the available memory. In a database-implemented message queue, an enqueuing process uses a connection to the database, or an enqueue session, to enqueue messages, and dequeuers use dequeue sessions to dequeue messages.

Conventional implementations of message queues do not scale well. Specifically, as the number of dequeue sessions increases, the contention for the "hot" messages at the head of the queue increases, thereby degrading performance. In addition, when the enqueue sessions and dequeue sessions are spread across several systems, the amount of communication on the network and/or interconnect between systems can become excessive.

Sharded queues address some of these issues. A sharded queue includes one or more shards. Within each shard, the messages are ordered based on enqueue time. However, no message order is enforced between shards. Typically, a dequeue session dequeues messages from each shard in a first-in first-out order. However, no dequeue order is enforced between shards. Implementations of sharded queues are described in U.S. Patent Application Pub. No. 2014/0372486, U.S. Patent Application Pub. No. 2014/0372489, and U.S. Patent Application Pub. No. 2014/0372702, the contents of which are incorporated herein by reference in their entirety.

Various caching algorithms exist for selecting a subset of data to store in memory. These algorithms include suboptimal algorithms, such as first-in, first-out (FIFO) and least recently used (LRU), as well as optimal algorithms, such as optimal page replacement (OPT) for virtual memory swapping. However, these techniques are not directly transferrable to a sharded queue where no enqueue order or dequeue order is enforced between shards, and/or to a multi-dequeuer queue where multiple dequeuers can potentially dequeue messages from any shard. For example, such algorithms are not designed to accommodate multiple enqueuers, multiple dequeuers, and/or multi-sharded queues. Furthermore, optimal algorithms require certain information to be known that cannot be readily ascertained in a queue with multiple shards and multiple dequeuers. For example, the OPT algorithm requires the sequence of page accesses to be known.

Thus, there is a need for optimal message cache management for message queues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
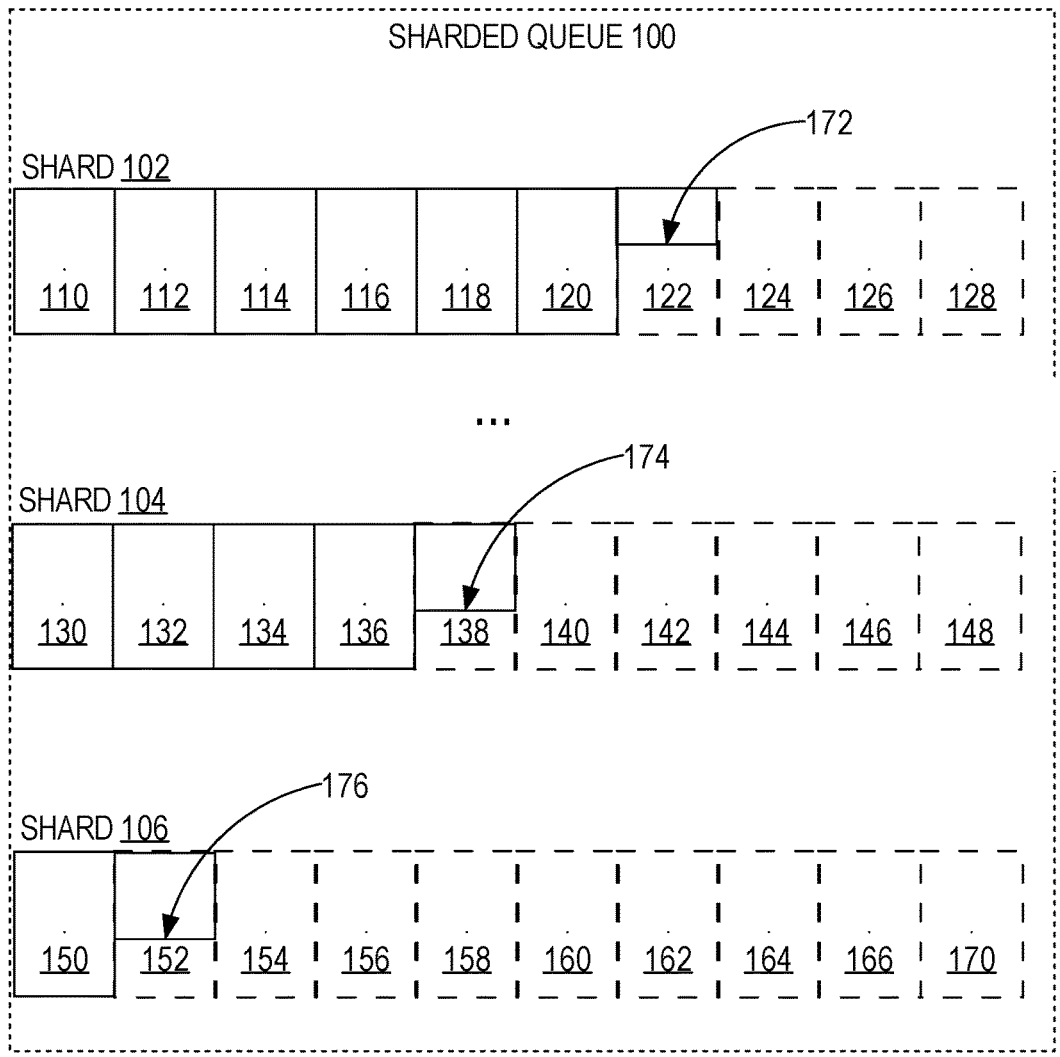
FIG. 1 is a block diagram depicting an example sharded queue in accordance with one or more embodiments.

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring embodiments.

General Overview

Techniques are described herein for message cache management for message queues. A sharded queue includes one or more shards. Within each shard, the messages are ordered based on enqueue time. However, no message order is enforced between shards. The number of shards in a sharded queue may change during runtime. A queue that does not have multiple shards implemented is a queue with one shard. Generally, each dequeuer dequeues messages from a plurality of shards of the sharded queue, where all the messages from a particular shard are dequeued in order. No dequeue order is enforced between shards. Each shard includes one or more ordered subshards. When a dequeuer dequeues from a particular shard, it processes the ordered subshards to obtain the messages in enqueue order.

Statistics on dequeue rates are collected and updated to determine estimated access time data for a plurality of subshards. For each dequeuer that dequeues from the sharded queue, statistics are collected and updated for each dequeuer-shard pair. For example, for a particular dequeuer, a dequeue rate may be determined for each shard of a plurality of shards of the sharded queue.

Using the dequeue rates for the dequeuer-shard pairs, estimated access time data is generated. The estimated access time data includes estimated data regarding future accesses of the sharded queue. For example, the estimated access time data may include the earliest estimated access time of a particular subshard by any dequeuer that is scheduled to access the particular subshard.

The estimated access time data for the plurality of subshards is used for message cache management. For example, the estimated access time data may be used to determine which subshards of the sharded queue to store in the message cache. Subshards that are stored in the message cache are referred to herein as "cached subshards." In some embodiments, the estimated access time data is used to determine that a cached subshard should be evicted from the message cache and/or that an evicted subshard should be stored in the message cache.

This approach improves performance by eliminating some unnecessary eviction operations on cached subshards in the message cache and/or restore operations from secondary storage, such as by reducing disk I/O for queues that are backed by secondary storage. In a relational database, this approach further improves performance by reducing SQL execution overhead for retrieving data stored in secondary storage. Furthermore, this approach more efficiently uses memory in the message cache. In addition, this approach reduces the occurrence of situations where a subshard is not stored in the message cache at a time that a dequeuer attempts to dequeue a message from the subshard, thereby avoiding the overhead and latency of accessing the message in secondary storage. In some embodiments, this approach approximates the optimal page replacement (OPT) for virtual memory swapping based on projections of the future enqueue rate and/or the future dequeue rates of each dequeuer on each shard.

Queues and Sharded Queues

FIG. 1 is a block diagram depicting an example sharded queue in accordance with one or more embodiments. Sharded queue 100 includes multiple shards 102-106. While the illustrated embodiment shows three shards, the actual number of shards used to implement a sharded queue may vary from implementation to implementation. In some embodiments, the number of shards for a sharded queue can be specified by an administrator. Alternatively and/or in addition, lower and/or upper bounds may be specified for the number of shards 102-106 in a sharded queue 100. Alternatively and/or in addition, a system that implements the sharded queue 100 may determine the number of shards and/or dynamically vary the number of shards. Embodiments described herein are described with respect to a sharded queue with one or more shards, and may be generalized to a queue with any number of shards, including a queue with one shard and/or a queue that is not sharded.

One or more enqueuers enqueue messages in the sharded queue 100. As used herein, the term "message" refers to any data to be communicated via a queue. In some embodiments, a message includes a set of metadata and a payload. The shards 102-106 store distinct sets of messages for the same sharded queue 100. Within each shard 102-106, messages are ordered based on enqueue time. However, no message order is enforced between shards 102-106. To store items in enqueue order, any means of storage that allows the enqueue order to be reconstructed from the stored data is sufficient.

In some embodiments, all messages from a particular enqueuer are enqueued in a particular shard of the sharded queue. As used herein, "enqueue affinity" refers to the relationship between the particular shard and the particular enqueuer. Enqueue affinity ensures session ordering requirements are met, in the absence of failures, because every dequeuer will see the messages each enqueuer enqueued in the correct order. For example, when a first set of one or more enqueuers enqueue messages into sharded queue 100, the messages are always enqueued into shard 102; when a second set of one or more enqueuers enqueue messages into sharded queue 100, the messages are always enqueued into shard 104; when a third set of one or more enqueuers enqueue messages into sharded queue 100, the messages are always enqueued into shard 106.

In some embodiments, the shards 102-106 of the sharded queue are maintained separately from each other. For example, the shards 102-106 may be maintained by multiple database server instances of a multi-instance database, other server application instances, and/or computing units. In some embodiments, each database server instance of a multi-instance database maintains a single shard 102-106 of a sharded queue. Alternatively and/or in addition, one or more instances of a multi-instance database may maintain multiple shards 102-106 of a sharded queue 100. Alternatively and/or in addition, the multiple shards 102-106 may be maintained by a single server, application, and/or computing unit. As used herein, the term "server," refers to a combination of integrated software components and an allocation of computational resources, such as memory, a node, and processes on the node for executing the integrated software components, where the combination of the software and computational resources are dedicated to providing a particular type of function on behalf of clients of the server.

Subshards

Each shard 102-106 may be divided into one or more subshards 110-170. As used herein, the term "subshard" refers to a sequence of one or more adjacent messages in a shard, where adjacency is determined by message enqueue time. A subshard includes a subset of messages enqueued in a particular shard. Within a subshard, messages are stored in enqueue order. For example, all of the messages within subshard 110 can be retrieved in order based on the time the message was enqueued by any enqueuer that enqueues into shard 102. Subshards of a shard are themselves also ordered by enqueue-time. For example, all messages in subshard 110 were enqueued into shard 102 before the messages in subshard 112, and all messages in subshard 112 were enqueued into shard 102 before the messages in subshard 114, and so on. In some embodiments, the techniques described herein are implemented on a queue that is not sharded, which can be treated as a queue with a single shard. In this case, the entire queue is treated as a single shard that contains a plurality of subshards.

A dequeuer can access the messages in each shard in enqueue-time order based on the ordering of subshards 110-170 and the ordering of messages within each subshard 110-170. When a particular enqueuer only enqueues messages into a particular shard, a dequeuer can dequeue the messages from the particular enqueuer in order, thereby maintaining session ordering.

When a new message is enqueued, it is added at the shard tail of a queue shard. In some embodiments, a shard tail reference 172-176 identifies the queue shard tail of the respective shard 102-106. For example, the shard tail reference may be a pointer into a current subshard 122, 138, and 152 (e.g. in volatile memory and/or in secondary storage). As used herein, the term "current subshard" refers to a subshard comprising the shard tail of a respective shard 102-106. When a current subshard becomes full, subsequent messages for the shard are enqueued into the next subshard allocated to the shard. For example, when the current subshard 122 of shard 102 is full, subshard 124 becomes the current subshard, and subsequent messages for shard 102 are stored in subshard 124. In some embodiments, when a particular shard 102 is associated with one or more active enqueuers that can enqueue messages into the particular shard 102, the current subshard 122 of the particular shard 102 is always cached in volatile memory to facilitate enqueue operations and dequeue operations.

Subshards 124-128, 140-148, and 154-170 are generated at a later point in time as additional messages are enqueued in the corresponding shards 102-106. In some embodiments, the volatile memory and/or secondary storage for a subshard may be pre-allocated, and/or allocated when a current subshard becomes full and a next current subshard is needed. Subshards 110-120, 130-136 and 150 are illustrated with a solid line to indicate that these subshards are full. The current subshards 122, 138, 152 are illustrated partially with a solid line and partially with a dashed line to indicate that these subshards are partially full. Future subshards 124-128, 140-148 and 154-170 are illustrated with a dashed line to indicate that these subshards do not contain messages.

At a logical level, a sharded queue, each shard in the queue, and each subshard in the queue's shards each correspond to a set of messages. When implemented on a computer system, corresponding data structures are generated and stored in memory and/or in secondary storage, as shall be described in greater detail hereinafter. As used herein, depending on the context in which the term appears, the term "subshard" may refer to a logical set of messages, the set of messages as stored in volatile memory (e.g. a "cached subshard"), and/or the set of messages as stored in secondary storage, (e.g. a set of rows in a queue table). As used herein, depending on the context in which the term appears, and the term "shard" may refer to a logical set of messages and/or subshards, the set of messages as stored in volatile memory (e.g. one or more cached subshards), and/or the set of messages as stored in secondary storage, (e.g. a set of rows in a queue table).

Message Cache

The sharded queue 100 may be implemented in both volatile memory and secondary storage. As used herein, the term "cached subshard" refers to a representation of a subshard that is stored in memory, such as in a message cache. A representation of a cached subshard may also be stored in secondary storage, making the cached subshard persistent. In some cases, such as when the sharded queue 100 does not fit entirely in the message cache, a representation of one or more subshards may be stored only in secondary storage. When a message is enqueued in a subshard, the message is stored in at least one of a representation of the subshard in volatile memory and a representation of the subshard in secondary storage.

The message cache provides a fast in-memory access path to all queuing functionality including enqueue operations, dequeue operations, and notification operations. A message cache can store messages from one or more distinct queues, including one or more distinct sharded queues. When a queue operation is performed on a cached subshard, enqueuers and dequeuers do not need to scan or sort structures, such as database tables, in secondary storage. Compared to I/O operations, queue operations in memory have no disk latency. In some embodiments, all subshards with current activity are stored in the message cache to avoid costly SQL operations when there is sufficient room in the message cache. For example, in some embodiments, the current subshards 122, 138 and 152 of each shard 102-106 with existing enqueuers is always a cached subshard.

Example System Architecture

Figure 4A:
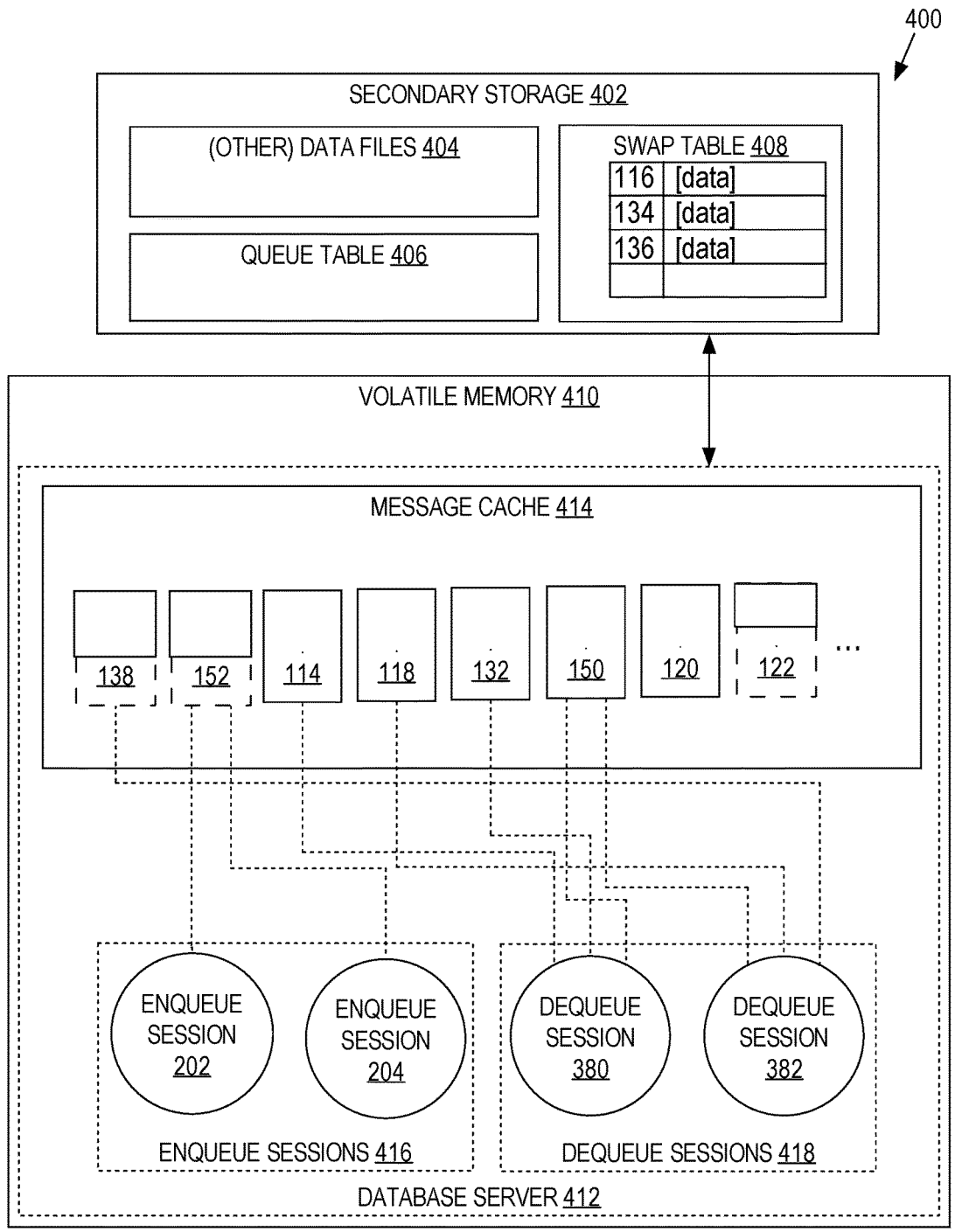
FIG. 4A is a block diagram depicting am example database system in accordance with one or more embodiments.

FIG. 4A is a block diagram depicting an example database system in accordance with one or more embodiments. Database system 400 includes database server 412. A database server governs and facilitates access to one or more databases, processing requests by clients to access the one or more databases. The database server 412 manages data files 404 corresponding to a database stored in secondary storage 402. The database server 412 also maintains persistent data corresponding to a sharded queue 100 in secondary storage 402, such as queue table 406. The database server 412 also maintains a message cache 414 in volatile memory 410. In some embodiments, the message cache 414 is maintained in a system global area (SGA) of the database system 400 that includes volatile memory 410 that is shared by all the processes of the database server 412.

The database server 412 maintains and manages a plurality of cached subshards in the message cache 414 to facilitate in-memory queue operations by the enqueue sessions 416 and dequeue sessions 418 for the sharded queue 100. As used herein, the term "session" refers to a connection to the database, which may include one or more processes of the database server 412 and/or one or more client processes. Although some embodiments are described in terms of enqueue sessions and dequeue sessions, the description also applies to enqueuers and dequeuers of a sharded queue, whether or not the enqueuer and/or dequeuer uses an enqueue session and/or a dequeue session to carry out queue operations.

Enqueuers

An enqueue session is a connection that allows an enqueuer to access the sharded queue 100. For example, an enqueuer, such as a process, may enqueue a message in a particular shard of the sharded queue 100 via an enqueue session. As used herein the term "process" refers to an instance of a set of program instructions running in a computer. A process may have a virtual address space, executable code, open handles to system objects, a security context, a unique process identifier, environment variables, a priority class, minimum and maximum working set sizes, and/or one or more threads of execution.

Figure 2:
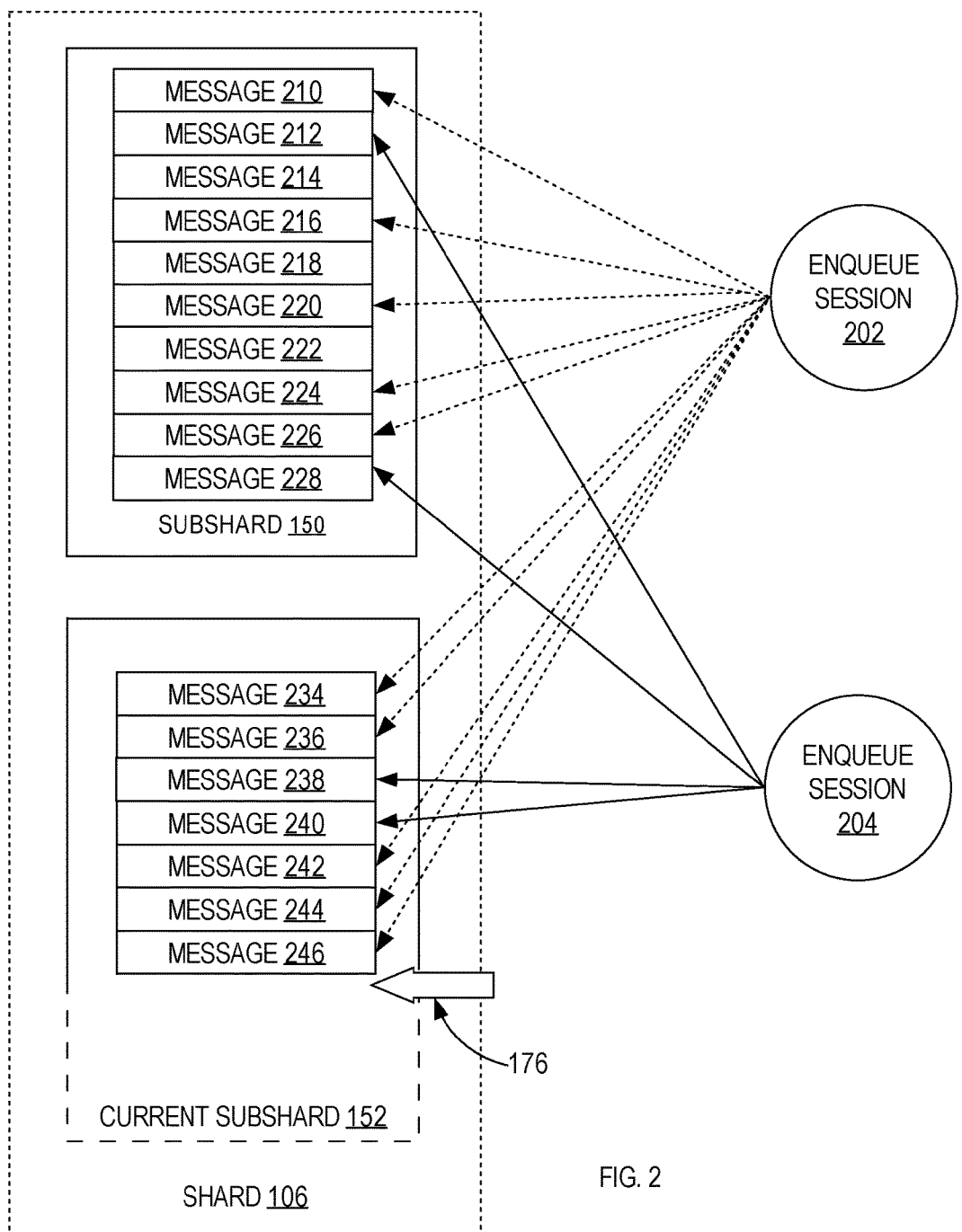
FIG. 2 is a block diagram depicting example enqueue sessions enqueuing messages in a particular shard of an example sharded queue in accordance with one or more embodiments.

FIG. 2 is a block diagram depicting example enqueue sessions enqueuing messages in a particular shard of an example sharded queue in accordance with one or more embodiments. Enqueue sessions 202-204 are assigned to (e.g. have enqueue affinity with) shard 106 of sharded queue 100. That is, all messages enqueued in the sharded queue 100 by enqueue sessions 202-204 are enqueued in shard 106 of the sharded queue 100.

Enqueue sessions 202-204 enqueue messages by adding messages 210-246 at the queue shard tail 176 of the current subshard 152 of shard 106. The messages 210-246 in shard 106 are stored in enqueue order with respect to any enqueue session 202-204 that is assigned to the shard 106. For example, message 210, enqueued by enqueue session 202, is enqueued before message 212, which is enqueued by enqueue session 204. Messages 210, 216, 220, 224, 226, 234, 236, 242-246 are enqueued by enqueue session 202, messages 212, 228, 238 and 240 are enqueued by enqueue session 204, and messages 214, 218 and 222 are enqueued by another enqueue session.

Dequeuers

As used herein, the term "dequeuer" refers to any entity that consumes messages from a sharded queue. For example, a dequeuer may be a process that dequeues messages from the sharded queue. To consume messages, a single dequeuer may use any number of dequeue sessions to consume messages from a single queue. A dequeue session is a connection that allows a dequeuer to access the sharded queue. In some embodiments, when a dequeuer has multiple dequeue sessions, the multiple dequeue sessions must coordinate consumption with the other dequeue sessions so that the same message is not consumed more than once by the same dequeuer.

Generally, any shard 102-106 of a sharded queue can potentially contain messages that must be consumed by any dequeuer of the sharded queue 100. Thus each dequeuer of the sharded queue 100 generally processes every shard 102-106 of the sharded queue 100 to dequeue the messages from the sharded queue 100. In some instances, a particular dequeue session may dequeue messages from only a subset of the shards of the sharded queue, which is described in greater detail in U.S. Patent Application Pub. No. 2014/0372486, U.S. Patent Application Pub. No. 2014/0372489, and U.S. Patent Application Pub. No. 2014/0372702.

Figure 3A:
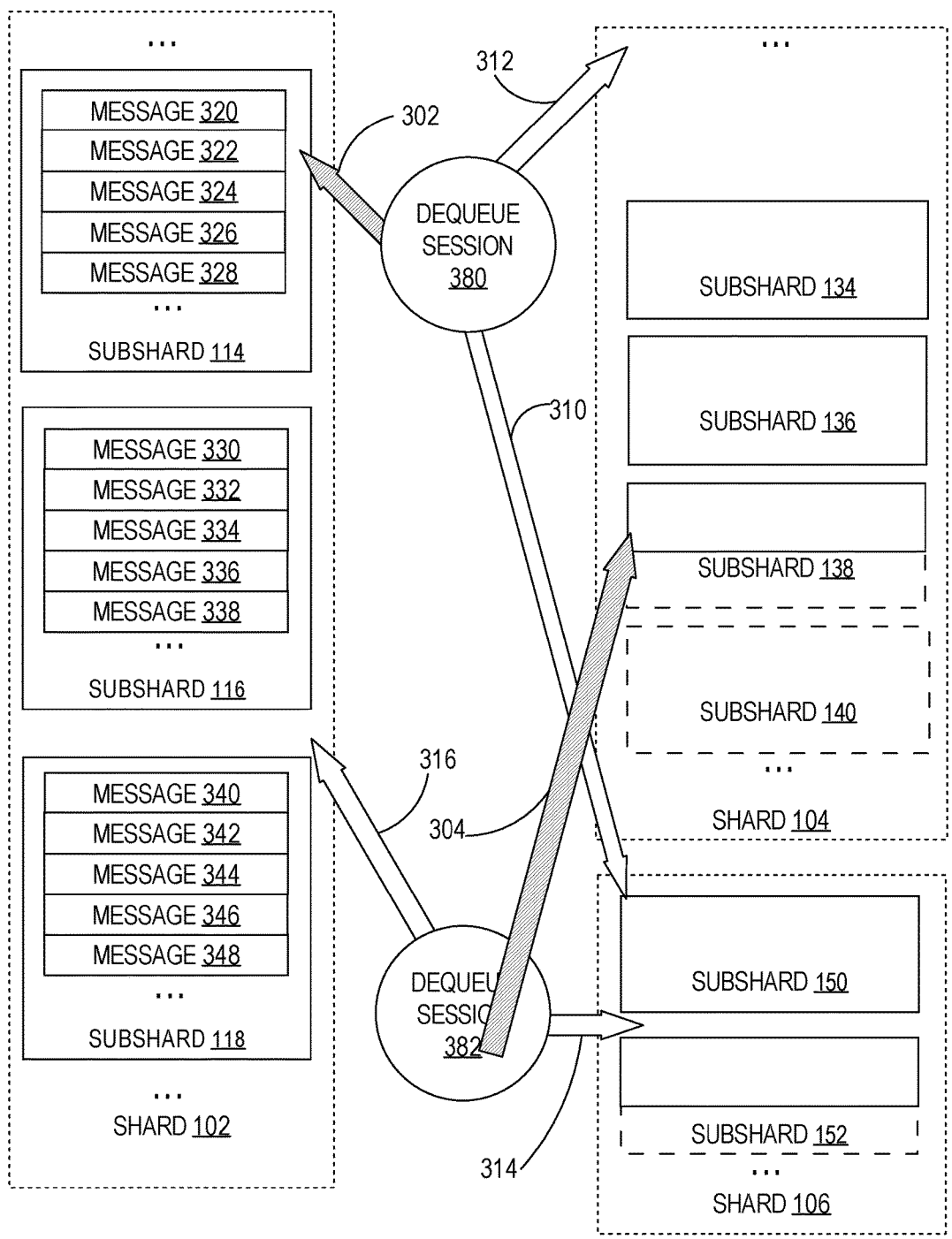
FIG. 3A is a block diagram depicting example dequeue sessions dequeuing messages from an example sharded queue in accordance with one or more embodiments.

FIG. 3A is a block diagram depicting example dequeue sessions dequeuing messages from an example sharded queue in accordance with one or more embodiments. A sharded queue may have one dequeuer or a plurality of dequeuers. In the illustrated embodiment, sharded queue 100 has two dequeuers. Dequeue sessions 380-382 each correspond to a dequeuer of the sharded queue 100. Each dequeue session 380-382 dequeues messages from each shard 102-106.

When a sharded queue has a plurality of dequeuers, the dequeuers may function independently of each other and may dequeue at different positions in each shard 102-106 the sharded queue 100. In some embodiments, a dequeue session 380-382 dequeues a subset of messages from one shard 102 in enqueue order with respect to the shard 102, then switches to another shard 104 to dequeue messages from the other shard 104 in enqueue order with respect to the other shard 104. The order in which the dequeue sessions 380-382 visit the shards 102-106 of a sharded queue 100 may be determined based on a variety of factors. The order followed by each dequeue session 380-382 may be the same and/or different over time, and may be the same and/or different from other dequeue session 380-382. Furthermore, the number of messages and/or subshards processed from a particular shard 102-108 during a single turn may be the same and/or different, and may be adaptive. A simple scheme for visiting the shards 102-106 is a round-robin scheme.

In some embodiments, each dequeue session 380-382 keeps a current dequeue position 302-316 for each shard 102-106 to track dequeue progress in each shard 102-106. At the time represented in the illustrated embodiment, current dequeue position 302 indicates that dequeue session 380 is currently processing subshard 114 of shard 102, while current dequeue position 304 indicates that dequeue session 382 is currently processing subshard 138 of shard 104. In one or more examples described herein, the current dequeue position is shown to a level of detail that identifies a subshard in the corresponding shard. In some embodiments, the current dequeue position for a dequeuer (or dequeue session) on a shard includes a particular message offset within the subshard or another reference to a particular message within the subshard.

Current dequeue position 310 indicates that the next subshard in shard 106 that dequeue session 380 will process is subshard 150. Current dequeue position 312 indicates that the next subshard in shard 104 that dequeue session 380 will process is subshard 132. Current dequeue position 314 indicates that the next subshard in shard 106 that dequeue session 382 will process is subshard 152. Current dequeue position 316 indicates that the next subshard in shard 102 that dequeue session 382 will process is subshard 118.

In some embodiments, each dequeue session 380 completely processes a subshard in its entirety before proceeding, either to the next subshard in the current shard or the next subshard in a different shard. For example, dequeue session 380 will completely finish processing subshard 114 before proceeding to either subshard 116 of the same shard 102, subshard 132 of shard 104, or subshard 150 of shard 106. Dequeue session 382 will completely finish processing subshard 138 before proceeding to subshard 140 of the same shard 104, subshard 152 of shard 106, or subshard 118 of shard 102.

Queue Table

Figure 5:
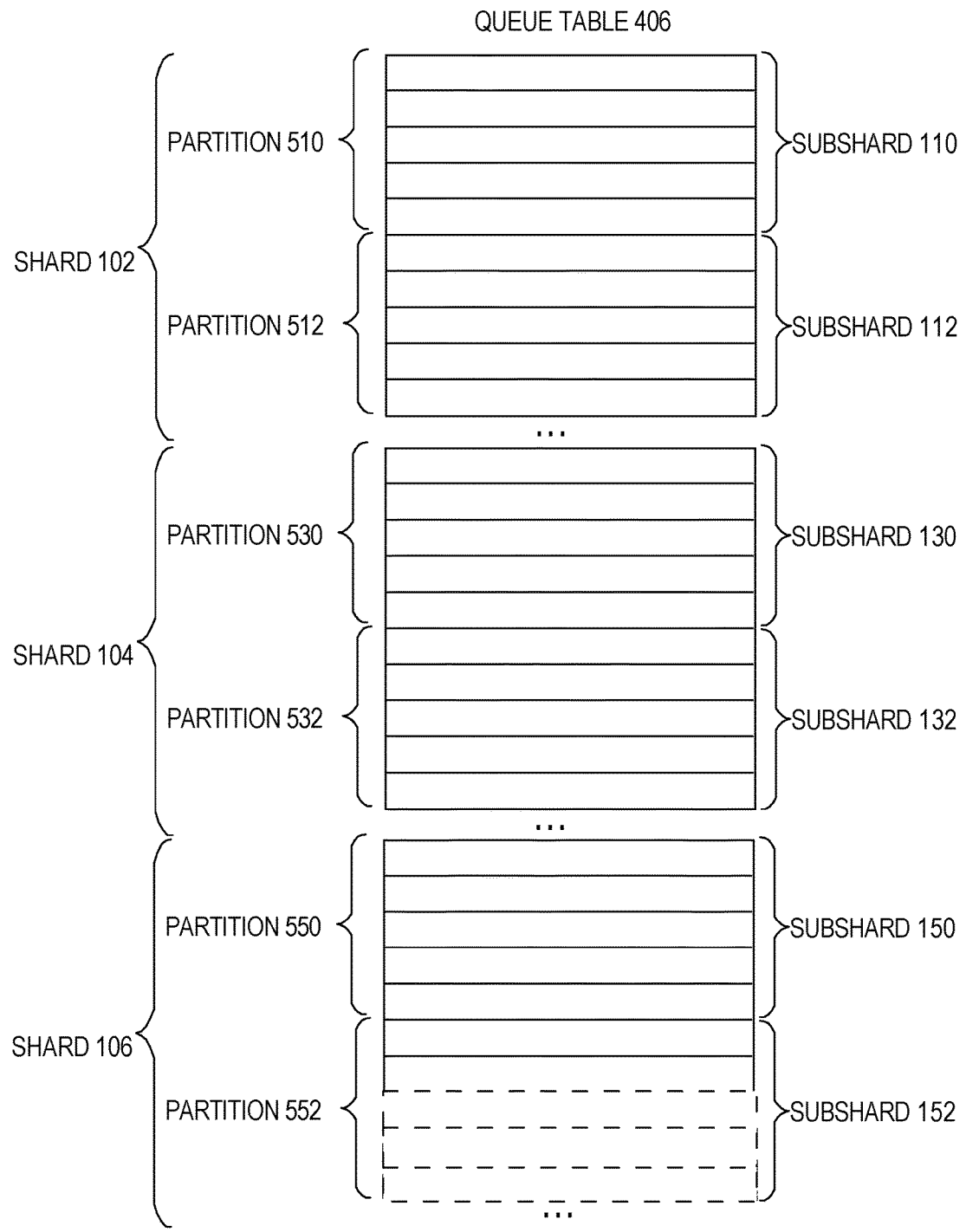
FIG. 5 is a block diagram depicting an example queue table in secondary storage for an example sharded queue in accordance with one or more embodiments.

FIG. 5 is a block diagram depicting an example queue table in secondary storage for an example sharded queue in accordance with one or more embodiments. Messages enqueued in the sharded queue 100 are persistently stored in the queue table 406 in secondary storage 402.

In some embodiments, each subshard of a given shard is assigned one or more queue table partitions 510-552 that have been assigned to the given shard. For example, shard 102 is assigned a set of partitions 510-512 of the queue table 406, and its subshards 102-122 are assigned to the queue table partitions 510-512 corresponding to shard 102; shard 104 is assigned a set of partitions 530-532 of the queue table 406, and its subshards 132-138 are assigned to the queue table partitions 530-532 corresponding to shard 104; and shard 106 is assigned a set of partitions 550-552 of the queue table 406, and its subshards 150-152 are assigned to the queue table partitions 550-552 corresponding to shard 106.

In some embodiments, a single queue table partition can be assigned to multiple subshards. In alternative embodiments, the shards are divided into subshards without respect to the partitioning of queue table 300. Thus, the relationship between subshards and queue table partitions may be one-to-many, one-to-one, many-to-one, or there may be no particular relationship at all. The number of partitions used by each shard may vary based on a variety of factors, including the rate at which enqueuers are enqueuing messages to each shard, and the rate at which dequeuers are dequeuing messages from each shard. Thus, the number of partitions in any given shard may vary over time, with new partitions being added when enqueuers run out of storage for new messages, and partitions being dropped as dequeuers finish dequeuing all messages in a partition.

In some embodiments, an insert operation, such as a SQL INSERT, is performed on the queue table 406 to enqueue a persistent message into the queue table 406. In some embodiments, a select operation, such as a SQL SELECT, is performed on the queue table 406 to dequeue a message from the queue table 406. Alternatively, in some embodiments, dequeuing is always and/or primarily performed from the message cache 414.

Message Cache Management

Message cache management is performed to determine a set of subshards to maintain in the message cache. In some embodiments, message cache management is performed at least in part by one or more background processes, such as daemon processes of the database server 412. Example background processes shall be described in greater detail hereinafter.

In an ideal situation, all dequeuers keep up with enqueuers, and any subshards that a dequeuer needs to process will fit in the message cache. However, when dequeuers do not keep up with enqueuers, the number of unprocessed subshards increases. Dequeue sessions 418 can fall behind such that they must dequeue from a subshard other than the current subshard of a particular shard, which may already be in the message cache to facilitate enqueue operations.

For example, referring to FIG. 3A, dequeue session 380 is behind in shards 102, 104 and 106, and dequeue session 382 is behind in shard 102. Dequeue session 382 is current in shard 104; as indicated by its current dequeue position 304 for shard 104, dequeue session 382 is currently dequeuing from shard 104 at its current subshard 138. Dequeue session 382 is also current in shard 106; as indicated by its current dequeue position 314 for shard 106, dequeue session 382 will begin dequeuing from shard 106 at its current subshard 152 when it visits shard 106 to dequeue messages.

To address this issue, mechanisms to evict and restore subshards in the message cache are implemented, as shall be described in greater detail hereinafter. As used herein, the term "evict" refers to moving a cached subshard from the message cache to secondary storage. After a subshard is evicted, the subshard is no longer a cached subshard. As used herein, the term "restore" refers to moving a subshard from the secondary storage to the message cache. After a subshard is restored, the subshard is a cached subshard, and queue operations may be performed on the cached subshard in memory. Evict operations and restore operations allow queue operations to be performed in memory without limiting the size of the sharded queue based on the message cache size. Message cache management involves determining when to evict specific subshards to secondary storage 402 from the message cache 414 and when to restore specific subshards to the message cache 414 from secondary storage 402.

Dequeue Rate

Figure 3B:
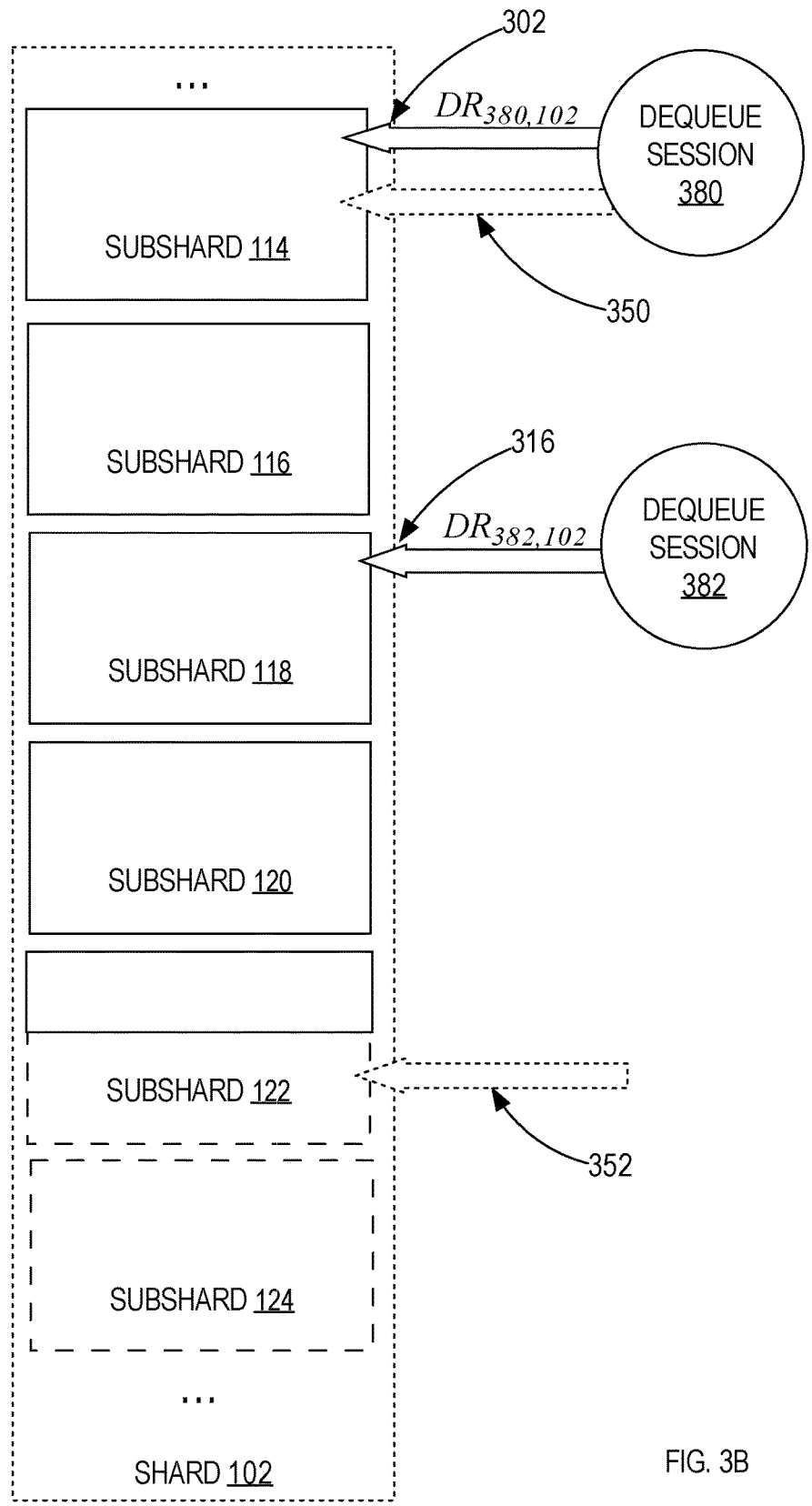
FIG. 3B is a block diagram depicting an example of estimated dequeue progress within a timeframe in accordance with one or more embodiments.

In some embodiments, message cache management is performed based on one or more dequeue rates. FIG. 3B is a block diagram depicting an example of estimated dequeue progress within a timeframe in accordance with one or more embodiments. A dequeue rate is determined for one or more dequeuer-shard pairs. As used herein, the term "dequeuer-shard pair" refers to a single dequeuer of the plurality of dequeuers and a single shard of a sharded queue. In the case that a dequeuer has more than one dequeue session, a dequeuer-shard pair may refer to either multiple dequeue sessions of the dequeuer, or a particular dequeue session of the dequeuer. The dequeuer-shard pairs for sharded queue 100 are <380:102>, <380:104>, <380:106>, <382:102>, <382:104> and <382:106>. In FIG. 3B, dequeuer-shard pairs <380:102> and <382:102> are shown, As used herein, the term "dequeue rate" refers to any quantitative value indicating a rate at which messages are dequeued. For example, the dequeue rate may be any quantitative value indicating a number of messages 320-348 per unit time or an amount of time per message 320-348. In some embodiments, the dequeue rate is a quantitative value indicating a number of subshards 114-118 per unit time and/or an amount of time per subshard 114-118.

The dequeue rate of a dequeuer-shard pair may be any quantitative value indicating a rate at which messages are dequeued from a particular shard of a sharded queue by a particular dequeuer and/or dequeue session. Each dequeuer-shard pair may have a different dequeue rate. For example, dequeue session 380 may dequeue from shard 102 at a first dequeue rate, from shard 104 at a second dequeue rate, and from shard 106 at a third dequeue rate. Likewise, dequeue session 382 may dequeue from shard 102 at a fourth dequeue rate, from shard 104 at a fifth dequeue rate, and from shard 106 at a sixth dequeue rate.

The dequeue rate for a dequeuer-shard pair may be based on dequeue statistics over a period of time. For example, the dequeue rate may be based on historical dequeue rates of the dequeuer from the particular shard. In some embodiments, the dequeue rate for a dequeuer-shard pair is based on a number of messages dequeued and/or a number of subshards processed during a period. The dequeue rate for dequeuer-shard pair <380:102> is $DR_{380,102}$, and the dequeue rate for dequeuer-shard pair <382:102> is $DR_{382,102}$.

In some embodiments, one or more dequeue statistics may be weighted to determine the dequeue rate for a dequeuer-shard pair. For example, to calculate a dequeue rate, more recent dequeue statistics collected for the particular dequeuer-shard pair may be weighted more heavily than less recent dequeue statistics collected for the particular dequeuer-shard pair. For example, the dequeue rate may be based on a weighted sum of recent dequeue statistics for the dequeuer-shard pair. Alternatively and/or in addition, the dequeue rate may be determined based on historical patterns over time (e.g. time of day, date, day of week, week, month, year, or any other historical pattern), historical workload statistics for the system, historical workload statistics for one or more dequeuers, administrator and/or user input, and any other factor that has predictive value with respect to a rate of dequeuing messages.

Rate Calculation and Recalculation

In operation, enqueue sessions and dequeue sessions can vary in performance over time. For example, network latency, resource unavailability, workload changes and other factors can cause changes in the dequeue rate of a particular dequeuer-shard pair. Thus the statistics are maintained and updated continuously during operation.

In some embodiments, the dequeue rates for dequeuer-shard pairs may be periodically updated, such as based on a period of time, or based on a number of messages and/or subshards processed. In some embodiments, each dequeue session is configured to completely process a subshard in its entirety before proceeding to another subshard.

In some embodiments, an update to a dequeuer-shard dequeue rate is made when a dequeue session begins dequeuing a subshard, finishes dequeuing a subshard and/or otherwise transitions from a subshard to another subshard, including when the dequeue session transitions from a subshard in one shard to a subshard in a different shard. In some embodiments, a dequeue session 380-382 or another element of the database server 412 updates and/or triggers an update of a dequeue rate for a dequeuer-shard pair when the dequeue session 380-382 begins or finishes processing a subshard (or a set number of subshards) in the specified shard.

Estimated Access Time Data

Given the current dequeue positions 302-316 for each dequeuer in each shard and the corresponding dequeue rates for each dequeuer-shard pairs, estimated access time data can be generated. As used herein, the term "estimated access time data" refers to any data relating to a prediction of a time that one or more subshards will be accessed, such as a time that an enqueue and/or dequeue operation will be performed on one or more subshards. In some embodiments, in addition to measuring and predicting the dequeue rate for each dequeuer-shard pair, the system measures and predicts the enqueue rate for each shard. The estimated enqueue rates let the system ensure there is sufficient free space in the message cache for enqueuers in the near future.

Referring to FIG. 3B, based on the dequeuer-shard dequeue rate $DR_{380,102}$ and the current dequeue position 302 of dequeue session 380 in shard 102, it is estimated that a future dequeue position 350 of dequeue session 380 at a future time $T_f$ will be in subshard 114. Based on the dequeuer-shard dequeue rate $DR_{382,102}$ and the current dequeue position 316 of dequeue session 382 in shard 102, it is estimated that a future dequeue position 352 of dequeue session 382 at $T_f$ will be in subshard 122. The future dequeue positions 350-352 are examples of estimated access time data.

Figure 4B:
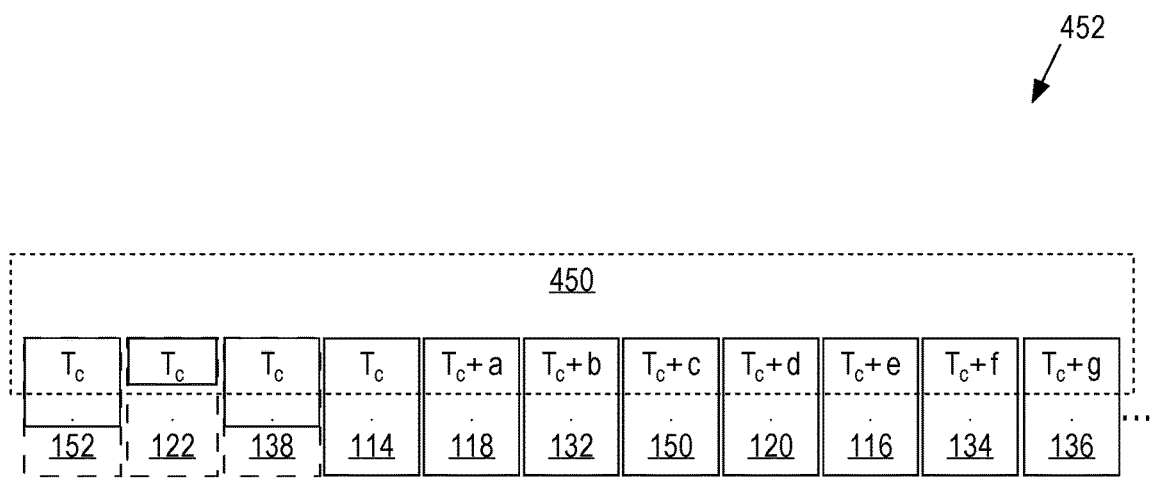
FIG. 4B is a block diagram depicting example estimated access time data in accordance with one or more embodiments.

FIG. 4B is a block diagram depicting example estimated access time data in accordance with one or more embodiments. Estimated access time data 450 includes a plurality of earliest estimated access times for a plurality of subshards. The earliest estimated access time is the earliest time that any dequeuer and/or dequeue session 380-382 is estimated to access a particular subshard. For example, as shown in FIG. 3B, both dequeue sessions 380-382 will process subshard 120 at a future time. Given the dequeue rates $DR_{380,102}$ of the dequeuer-shard pair <380:102> and the current dequeue position 302 of dequeue session 380 in shard 102, it may be estimated that dequeue session 382 will access subshard 120 at a first time (e.g. $T_1$).

Given the dequeue rates $DR_{382,102}$ of the dequeuer-shard pair <382:102> and the current dequeue position 316 of dequeue session 382 in shard 102, it can be estimated that dequeue session 382 will access subshard 120 at a second time (e.g. $T_2$). Thus, if no other dequeue sessions will access subshard 120 in the future, then the earliest estimated access time $T_c+d$ for subshard 120 is the earliest time of $T_1$ and $T_2$.

In some embodiments, when one or more enqueue sessions 202-204 are enqueuing messages into a current subshard 152 of a shard 106, the current subshard 152 is considered currently accessed. Subshards that are currently accessed may be assigned a current time $T_c$ as the earliest estimated access time.

Access-Ordered List

In some embodiments, the estimated access time data includes an access-ordered list of subshards. The access-ordered list includes any data that indicates a sequence of estimated future subshard accesses. The access-ordered list 452 is generated based on estimated access time data 450 generated for a plurality of shards of the sharded queue 100. For example, the access-ordered list 452 may be generated by sorting the subshards based on the earliest estimated access time of each subshard.

The access-ordered list 452 may omit subshards that are completely consumed by every dequeue session 380-382. For example, as shown in FIGS. 3A-3B, dequeue sessions 380-382 have completely consumed subshards 110-112 of shard 102 and subshard 130 of shard 104. Thus, subshards 110-112 and 130 are omitted from the access-ordered list 452 since all dequeue sessions 380-382 have finished dequeuing messages from these omitted subshards. Alternatively and/or in addition, the access-ordered list 452 may retain one or more subshards that have been completely consumed by all dequeue sessions 380-382. In this case, a watermark reference may be used to indicate a position in the access-ordered list 452 before which all prior subshards have been completely consumed by all dequeue sessions 380-382.

Recalculation of the access-ordered list 452 may be triggered by one or more events. For example, the access-ordered list 452 may be recalculated when the dequeue rate for a particular dequeuer-shard pair changes significantly. In this case, recalculating the access-ordered list 452 may include recomputing one or more estimated earliest access times 450 for subshards of the particular shard that are not yet consumed by the particular dequeuer.

In some embodiments, currently accessed subshards (e.g. subshards with an earliest estimated access time that is the current time $T_c$) are included in the access-ordered list 452. For example, subshards 114, 122, 138 and 152 are currently accessed subshards, as indicated by their earliest access times of $T_c$. Dequeue session 380 is currently dequeuing from subshard 114, while dequeue session 382 is currently dequeuing from subshard 138. In addition, enqueue sessions 202-204 are currently enqueuing messages to subshard 152, while other enqueue sessions (not shown) are currently enqueuing messages into subshards 122 and 138.

In some embodiments, the database server 412 implements multiple sharded queues, and a unified access-ordered list is generated for all subshards of the multiple sharded queues without respect to the sharded queue to which the subshards belong. For example, a single set of one or more background processes of the database server 412 may use the unified access-ordered list to perform message cache management for the multiple sharded queues simultaneously. That is, a particular subshard of the multiple sharded queues may be evicted and/or restored based on the estimated access time data for the subshards of the multiple sharded queues without respect to the sharded queue that the particular subshard belongs to.

Skip List Implememntation

In some embodiments, the message cache 414 and the access-ordered list 452 are implemented as a randomized skip list in volatile memory 410. As used herein, the term "skip list" refers to a data structure that allows fast search within an ordered sequence of elements. Each node of the skip list represents a subshard from any shard 102-106. The nodes of the skip list are ordered by earliest estimated access time of the corresponding subshard. Nodes at the head of the skip list represent subshards that are currently accessed and/or subshards that are about to be accessed. Nodes closer to the tail of the skip list represent subshards that will be accessed further in the future. When the order of the access-ordered list 452 is modified, links between nodes (e.g. subshards) in the randomized skip list are modified to reflect the new order.

Evicting a Cached Subshard

Evicting a cached subshard is performed when it is determined that the cached subshard will likely not be accessed soon. In some embodiments, eviction is only performed in response to a determination that it is desirable to free up space in the message cache 414 and/or in volatile memory 410. For example, evictions may be performed when an amount of memory used by the message cache 414 reaches a threshold (e.g. 50% of available memory).

In some embodiments, cached subshards that likely will not be accessed within an eviction horizon are candidates to evict. That is, if it is estimated that a particular cached subshard will not be accessed within a timeframe indicated by the eviction horizon, the particular subshard may be evicted from the message cache 414. In some embodiments, the eviction horizon indicates a timeframe starting from the current time. Subshards that likely will be accessed during this timeframe are maintained in the message queue. The eviction horizon may be a default value, and/or a value dynamically set by an administrator or another operator.

The eviction of a cached subshard may take a substantial amount of time and/or other computing resources, such as due to secondary storage I/O operations and/or the execution of database commands to write the subshard data to a database structure. For these reasons, evicting a cached subshard can potentially cause increased latency when performed by a dequeue session. In some embodiments, eviction is performed by one or more background processes, which shall be described in greater detail hereinafter. The timeframe may be also based on an eviction lag factor in addition to the eviction horizon. The eviction lag factor adjusts the eviction horizon to give a sufficiently conservative time period for eviction operations.

The eviction horizon and/or the eviction lag factor may be a default value, an adaptive value, and/or a value dynamically set by an administrator or another operator. The eviction horizon and/or eviction lag factor may be determined based on eviction statistics, such as the amount of time that it takes to evict one or more cached subshards. In some embodiments, the eviction horizon and/or eviction lag factor is a dynamic value that is recalculated periodically. In some embodiments, the eviction horizon and/or eviction lag factor is further based on one or more system characteristics, such as subshard size, hardware configuration, performance, available resources, queue size, and/or other system characteristics.

In some embodiments, when a cached subshard is evicted, a representation of the subshard is stored in secondary memory in a swap table 408. For example, each subshard representation may be stored as a row in swap table 408. Swap table 408 includes rows that each include a representation of evicted subshards 116, 134 and 136. In some embodiments, the representation of the subshard stored in secondary memory is a binary representation of the corresponding cached subshard. In some embodiments, subshard memory chunks in the message cache 414 are directly copied into secondary storage 402, such as into a row of swap table 408. A message cache may have one or more swap tables 408. In some embodiments, a message cache stores messages from one or more distinct queues. In this case, the one or more distinct queues may share one or more swap tables 408 or may implement one or more private swap tables 408 that is specific to a subset of the one or more distinct queues.

Restoring a Subshard to the Message Cache

When a previously evicted subshard is restored, the stored representation is used to generate the cached subshard in the message cache 414. For example, a binary representation of a stored subshard in the swap table 408 may be restored by reading the binary representation of the subshard from the swap table 408 into volatile memory 410. In some embodiments, subshard memory chunks in secondary storage 402 are directly copied into the message cache 414.

A previously evicted subshard may be restored in response to an actual request to access the subshard. When a subshard is restored in response to an actual request instead of in advance of a request, an I/O operation must first be completed in order to retrieve the subshard from secondary storage. Thus, it is desirable to minimize the occurrence of restoring a subshard in response to an actual request, such as by prefetching evicted subshards before an actual request.

As used herein, the term "prefetch" refers to restoring a previously evicted subshard in advance of any actual request to access the subshard, such as a request or instruction to perform a queue operation involving the subshard. An uncached subshard may be prefetched if there is room in the message cache and there is a good likelihood that a queue operation, such as a dequeue operation, will be performed on the subshard in the near future. In some embodiments, a previously evicted subshard is prefetched when it is determined that the subshard will be likely accessed within a timeframe.

Restoring a cached subshard may take a substantial amount of time, such as due to secondary storage I/O operations and/or the execution of database commands to retrieve the subshard data from a database structure. Because restoring a cached subshard can take a nontrivial amount of time, it can cause increased latency when performed by a dequeue session. In some embodiments, prefetching is performed by one or more background processes, which shall be described in greater detail hereinafter.

In some embodiments, the timeframe for prefetching subshards is based on a timeframe indicated by a prefetch horizon. The prefetch horizon indicates a timeframe relative to the current time. In some embodiments, subshards that will likely be accessed during this timeframe are restored to the message queue. The prefetch horizon may be the same or different than the eviction horizon.

The length of the prefetch horizon is a trade-off. If the prefetch horizon is too short, dequeue sessions may encounter subshards that are not restored before a dequeue operation is requested. If the prefetch horizon is too long, the message cache may become over-filled with cached subshards that are not currently accessed. The timeframe may be also based on a prefetch lag factor in addition to the prefetch horizon. The prefetch lag factor adjusts the prefetch horizon to give a sufficiently conservative time period for prefetch operations.

The prefetch horizon and/or the prefetch lag factor may be a default value, an adaptive value, and/or a value dynamically set by an administrator or another operator. The prefetch lag factor and/or the prefetch horizon may be based on restore statistics, such as the amount of time that it takes to restore and/or prefetch one or more cached subshards. In some embodiments, the prefetch lag factor and/or the prefetch horizon is a dynamic value that is recalculated periodically. In some embodiments, the prefetch lag factor and/or the prefetch horizon is further based on one or more system characteristics, such as subshard size, hardware configuration, performance, available resources, queue size, and/or other system characteristics.

Out-of-Order Messages

In some embodiments, the sharded queue 100 is configured to handle out-of-order messages. An out-of-order message includes a delivery indication that indicates a delivery time other than by enqueue time. Examples of out-of-order message include messages with an indicated delay time or a scheduled delivery time.

In some embodiments, out-of-order messages are stored in subshards based on enqueue time. When out-of-order messages are enqueued based on enqueue time, some estimated access time data, such as the earliest estimated access time, cannot be determined based on dequeue rates and current dequeue positions alone. Furthermore, a dequeue session may need to dequeue from another subshard before completely consuming a current subshard in some embodiments.

In some embodiments, the earliest estimated access time for a particular subshard containing out-of-order messages is further based on the delivery indication of one or more out-of-order messages in the corresponding shard. In some embodiments, the earliest estimated access time is based on the fraction of the particular subshard that has been dequeued by each dequeuer. In this case, the fraction processed by each dequeue session of a particular subshard is maintained, since a dequeue session may potentially dequeue out of order.

Background Monitor Process

In some embodiments, one or more background monitor processes monitor dequeue sessions to detect whether a dequeuer has stalled mid-subshard. A dequeue session can sometimes slow down, completely stall, and/or fail while in the middle of processing a subshard. In this case, the corresponding dequeuer-shard dequeue rate may not be updated, such as in embodiments where updates occur when a dequeuer transitions between subshards. Likewise, a dequeue session may speed up within a subshard. To prevent such changes from affecting the estimated access time data in a manner that affects message queue management, a background monitor process may monitor dequeue session progress within subshards.

For example, the background monitor process may determine whether any dequeuer has slowed, stalled, failed, sped up, or otherwise changed speed while processing a subshard. When the background monitor process determines that a dequeuer has changed speed while processing a particular subshard, the background monitor process may update and/or cause update of the corresponding dequeuer-shard dequeue rate, estimated access time data 450, and/or other statistics.

The background monitor process may monitor dequeuing progress by checking the dequeue sessions 418 in a predefined order and/or an adaptive order. In some embodiments, the background monitor process traverses the access-ordered list 452 beginning with the subshard that is likely the next-accessed subshard based on the earliest estimated access times 450. For each dequeue session that has not completely consumed the subshard, the background monitor process compares the current position of the dequeue session with the corresponding dequeuer-shard dequeue rate and calculates the number of subshards the dequeue session should have traversed since the last update. If the dequeue session should have traversed more subshards or less subshards than indicated by the current position of the dequeue session, then the dequeue session has potentially slowed, stalled, failed, and/or otherwise changed speed. In some embodiments, when this condition is detected, the dequeue rate of the corresponding dequeuer-shard pair is updated, and the access-ordered list 452 and/or other estimated access time data 450 is recalculated.

Background Eviction Process

Eviction operations may be performed by one or more background eviction processes. A background eviction process may identify cached subshards to evict, such as based on an eviction horizon and/or memory considerations. In some embodiments, the background eviction process only evicts cached subshards when a memory condition is present.

In some embodiments, the background eviction process prioritizes the eviction of cached subshards that, based on the estimated access time data, will be likely accessed in the most amount of time. For example, a background eviction process may traverse an access-ordered list 452 from the tail. The background eviction process attempts to evict each cached subshard encountered until it reaches subshards that, based on the estimated access time data, will be likely accessed within the timeframe indicated by the eviction horizon and/or the eviction lag factor. In some embodiments, the eviction lag factor is based on a rate at which the background eviction process evicts subshards.

Background Prefetch Process

Prefetching operations may be performed by one or more background prefetch processes. Because prefetching is performed on a particular subshard in advance of any actual request to access the particular subshard, a background prefetch process can potentially iterate over candidate subshards for prefetching without affecting performance at the time of the actual request or instruction to perform a queue operation involving the subshard.

In some embodiments, the background prefetch process prioritizes prefetching evicted subshards that, based on the estimated access time data, will be likely accessed in the least amount of time. For example, a background prefetch process may traverse an access-ordered list 452 from the head. The background prefetch process attempts to prefetch each evicted subshard encountered until it reaches subshards that, based on the estimated access time data, will be likely accessed after the timeframe indicated by the prefetch horizon and/or the prefetch lag factor. In some embodiments, the prefetch lag factor is based on a rate at which the background prefetch process restores evicted subshards.

Shared Disk Database Instances

In some embodiments, database server 412 is an instance in a distributed database system, such as a shared-disk database system. In this case, a storage system comprising secondary storage 402 is shared by multiple instances. The persistent queue table 406 is maintained in the shared storage system. Each instance maintains a local message cache 414 in its respective volatile memory 410.

In some embodiments, to minimize pinging in a multi-instance database, all message enqueues on a queue shard are done on a single instance. In addition, all message dequeues on a queue shard by the same dequeuer may be done on a single instance. If the enqueue instance and a dequeue instance for a queue shard are not the same, a cross process may send messages from the enqueuing instance to the dequeuing instance. Thus, the same subshard can exist in multiple instances.

In terms of message cache management, each cross process can be modeled as a dequeue process on the enqueuing instance and as an enqueue process in the dequeuing instance. The enqueue rate for a cross process is the dequeue rate for the cross process multiplied by the percentage of messages that are sent to the dequeuing instance. Although the system does not have control over the offered enqueue rate from enqueue sessions and the offered dequeue rate from dequeue sessions, the system can control the short-term dequeue rate (and hence the short-term enqueue rate) for each cross process to help manage the short-term memory requirements of message caches in a shared-disk database system.

Example Processes

Figure 6:
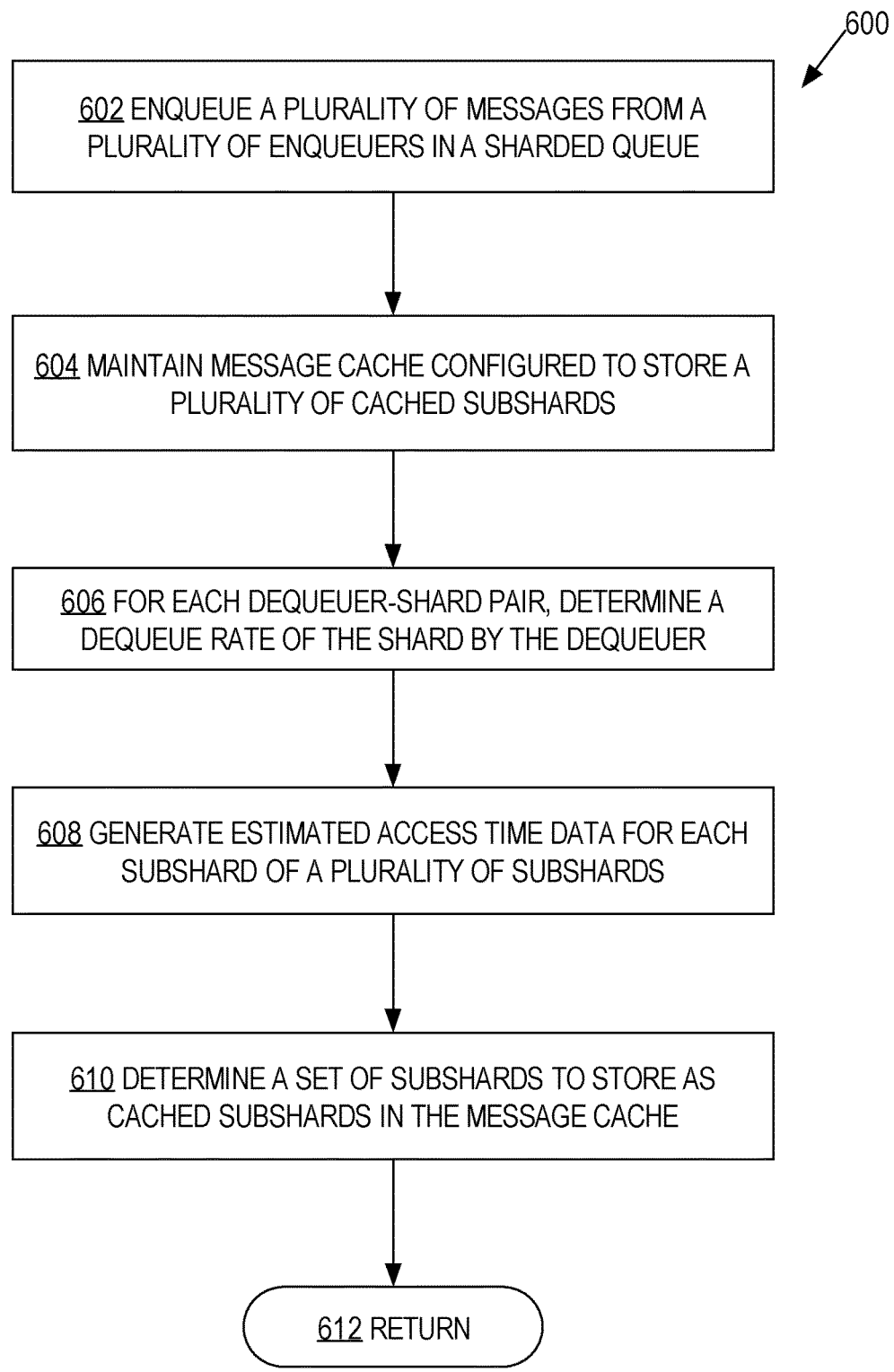
FIG. 6 is a flow diagram that illustrates an example process for message cache management in accordance with one or more embodiments.

FIG. 6 is a flow diagram that illustrates an example process for message cache management in accordance with one or more embodiments. Process 600 may be performed by one or more computing devices and/or processes thereof. For example, one or more blocks of process 600 may be performed by computing device 800. In some embodiments, one or more blocks of process 600 are performed by a database system, such as database system 400.

At block 602, the system enqueues a plurality of messages from a plurality of enqueuers in a sharded queue. In some embodiments, each enqueuer has enqueue affinity with a particular shard of a sharded queue, and messages enqueued by the enqueuer are enqueued at the tail of particular shard in a current subshard of the particular shard.

At block 604, the system maintains a message cache configured to store a plurality of cached subshards. The cached subshards correspond to a set of subshards of the sharded queue that are stored in memory to facilitate queue operations.

At block 606, the system determines, for each dequeuer-shard pair of a plurality of dequeuer-shard pairs, a dequeue rate of the shard by the dequeuer. In some embodiments, the dequeue rate is based on a number of subshards of the specified shard that the specified dequeuer has processed during a time period.

At block 608, the system generates estimated access time data for each subshard of a plurality of subshards based on the dequeue rates for the dequeuer-shard pairs. In some embodiments, the estimated access time data for a subshard is the earliest estimated access time of the subshard by any dequeuer of the sharded queue.

At block 610 the system determines a set of subshards to store as cached subshards in the message cache based on the dequeuer-shard pair dequeue rate information. For example, the system may determine which subshards to cache based on the estimated access time data generated from the dequeue rates of the dequeuer-shard pairs. In some embodiments, the system determines which subshards to store in the message cache based on the earliest estimated access time of each subshard in a plurality of subshards that are not completely consumed by all dequeuers. The set of subshards may be based on the amount of available memory in the message cache and/or the system. The cached subshards are selected to minimize evict operations and restore operations while ensuring availability of the cached subshard when a dequeue operation is performed by any dequeuer.

At block 612, process 600 returns and/or terminates. For example, processing may continue by passing control to a calling process, generating any appropriate record or notification, returning after a method or function invocation, or terminating.

Figure 7:
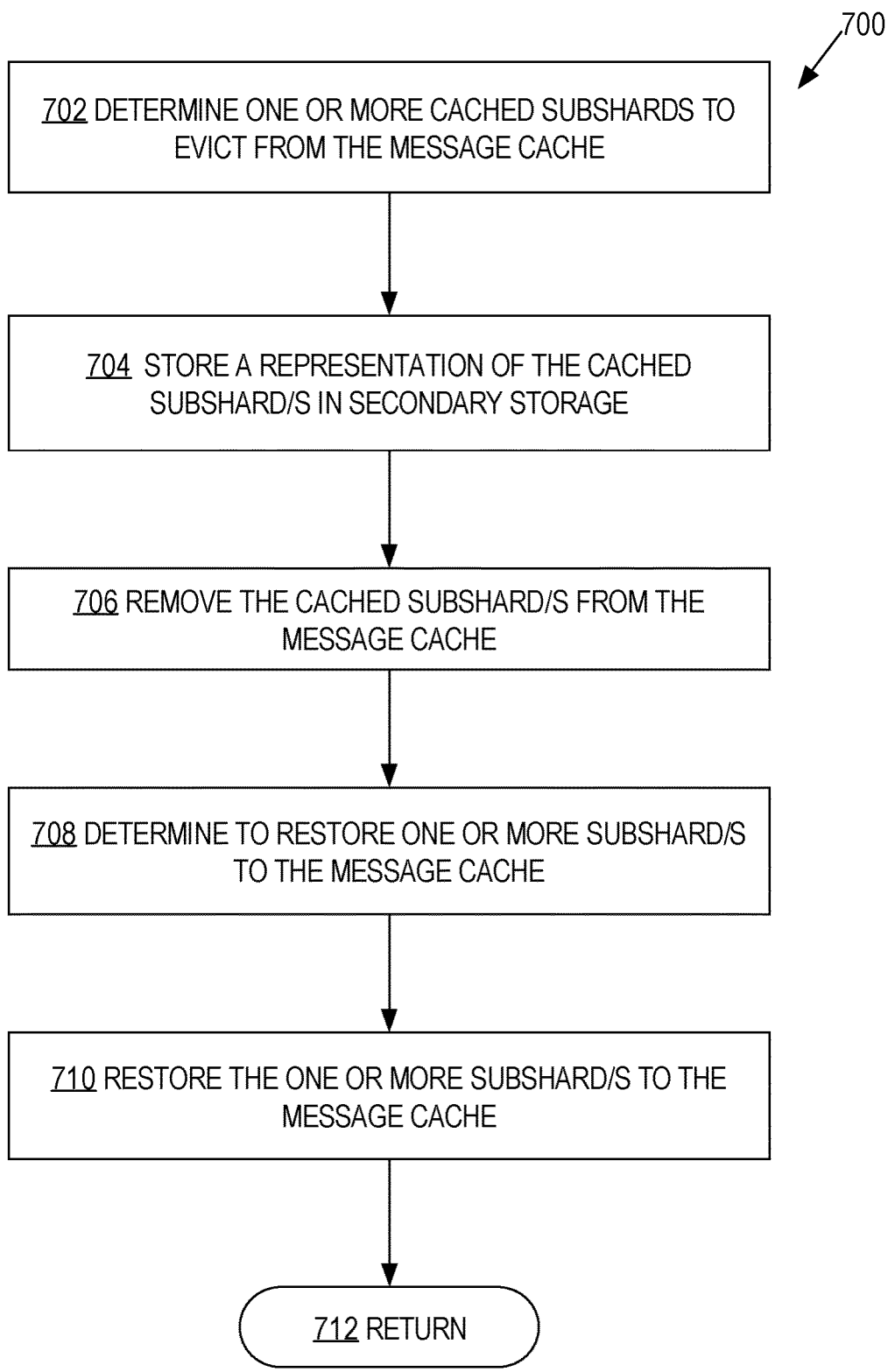
FIG. 7 is a flow diagram that illustrates an example process for message cache management in accordance with one or more embodiments.

FIG. 7 is a flow diagram that illustrates an embodiment of a process for message cache management in accordance with one or more embodiments. Process 700 may be performed by one or more computing devices and/or processes thereof. For example, one or more blocks of process 700 may be performed by computing device 800. In some embodiments, one or more blocks of process 700 are performed by a database system, such as database system 400.

At block 702 the system determines one or more cached subshards to evict from the message cache based on the dequeuer-shard rate information, and/or the estimated access time data generated from the dequeuer-shard pairs generated based on the dequeuer-shard rate information.

At block 704 the system stores a representation of the cached subshard/s in secondary storage. In some embodiments, the system stores a representation of the cached subshard in a database structure in secondary storage using a database command. For example, the system may store the representation of the cached subshard as a row in a swap table of the database.

At block 706 the system removes the cached subshard/s from the message cache.

At block 708 the system determines to restore one or more subshard/s to the message cache. For example, based on updated dequeuer-shard information, the system may determine that a previously evicted subshard should be restored in the message cache by prefetching the subshard and generating a cached subshard in the memory cache in anticipation of a future dequeue request from a dequeuer. In some cases, the determination to restore a subshard is made in response to an actual dequeue request from a dequeuer.

At block 710 restore the one or more subshard/s to the message cache. In some embodiments, the cached subshard is generated by retrieving a representation of the subshard from secondary storage. For example, a database command may be used to fetch a representation of the subshard from a database structure in secondary storage, such as a swap table.

At block 712, process 700 returns and/or terminates. For example, processing may continue by passing control to a calling process, generating any appropriate record or notification, returning after a method or function invocation, or terminating.

Database Systems

Since some embodiments described herein are implemented within the context of a database management system (DBMS), a description of a database management system is included herein. A DBMS manages a database. A DBMS may comprise one or more database servers. A database comprises database data and a database dictionary that are stored on a persistent memory mechanism, such as a set of hard disks. Database data may be stored in one or more data containers, each containing one or more records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

Users interact with a database server of a DBMS by submitting to the database server commands that cause the database server to perform operations on data stored in a database. A user may be one or more applications running on a client that interact with a database server.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. SQL/XML, is a common extension of SQL used when manipulating XML data in an object-relational database.

Performing operations within a database server often entails invoking multiple layers of software. A layer is set of software modules that perform a functionality that has been dedicated, to an extent, within a database server to the set of software modules. Executing an operation typically involves calling multiple layers of software, with one layer making a call to another layer, which during the execution of the first call, calls another layer. For example, to execute an SQL statement, an SQL layer is invoked. Typically, a client accesses a database server through an interface, such as an SQL interface to the SQL layer. The SQL layer analyzes and parses and executes the statement. During execution of the statement, the SQL layer calls modules of a lower layer to retrieve a particular row from a table and to update a particular row in a table. A client, such as a replication client, typically accesses the database via a database command to the database server, such as in the form of a SQL statement.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the database command itself performs no actions, but rather the DBMS, upon executing the database command, performs the corresponding actions. Typically, database commands are executed over a synchronous connection to the database.

Example Implementation System

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
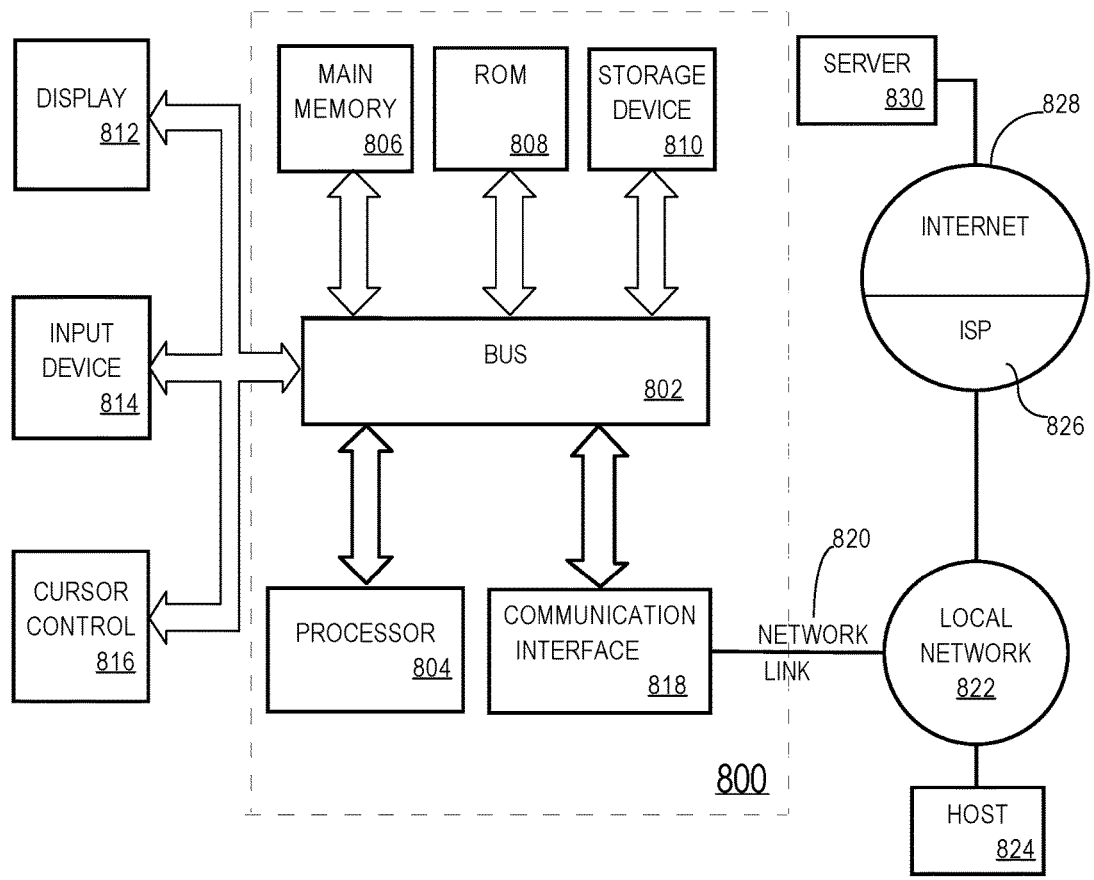
FIG. 8 illustrates a computer system upon which one or more embodiments may be implemented.

For example, FIG. 8 is a block diagram that depicts a computer system 800 upon which an embodiment may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    enqueuing a plurality of messages from a plurality of enqueuers in a queue comprising one or more shards, each shard of the one or more shards comprising one or more subshards;
    maintaining, in memory, a message cache configured to store a plurality of cached subshards;
    wherein the plurality of messages includes a particular message;
    wherein enqueuing the plurality of messages comprises enqueuing the particular message in a current subshard of a particular shard of the one or more shards, wherein enqueuing the particular message in the current subshard includes storing the particular message in a cached subshard corresponding to the current subshard of the particular shard;
    wherein each dequeuer-shard pair of a plurality of dequeuer-shard pairs comprises (a) a respective dequeuer of a plurality of dequeuers dequeuing from a respective shard of said one or more shards, and (b) the respective shard;
    determining dequeue rates for the plurality of dequeuer-shard pairs by at least determining, for each dequeuer-shard pair of said plurality of dequeuer-shard pairs, a dequeue rate of the respective shard of said each dequeuer-shard pair by the respective dequeuer of said each dequeuer-shard pair;
    generating estimated access time data comprising earliest estimated access times, said earliest estimated access times comprising an earliest estimated access time for each subshard of a plurality of subshards of the queue based on the dequeue rates for the plurality of dequeuer-shard pairs;
    determining a set of subshards of said queue to store as cached subshards in the message cache based on the earliest estimated access times for the plurality of subshards;
    maintaining the set of subshards as cached subshards in the message cache;
    while a first subshard, of the plurality of subshards, is being maintained as a cached subshard in the message cache, determining, based on the estimated access time data for the plurality of subshards, that the first subshard will likely not be accessed within a particular timeframe; and
    responsive to determining that the first subshard will likely not be accessed within the particular timeframe, evicting the first subshard from the message cache;
    wherein the method is performed by one or more computing devices.

2. The method of claim 1, after evicting a second subshard, of the plurality of subshards, from the message cache:
    based on the estimated access time data for the plurality of subshards, determining that the second subshard will be likely accessed within a second timeframe;
    responsive to determining that the second subshard will be likely accessed within the second timeframe, prefetching the second subshard to restore the second subshard in the message cache.

3. The method of claim 1, further comprising:
    maintaining, in secondary storage, a swap table;
    when a particular subshard is evicted from the message cache, storing a representation of the particular subshard in a row of the swap table;
    when the particular subshard is restored to the message cache, restoring the particular subshard, at least in part, by reading the representation of the particular subshard from the swap table into the message cache.

4. The method of claim 1, wherein:
    the earliest estimated access time of each subshard is the earliest estimated access time of the subshard by any dequeuer of the plurality of dequeuers and any enqueuer of the plurality of enqueuers.

5. The method of claim 1, further comprising:
generating an access-ordered list of subshards based on the estimated access time data for the plurality of subshards;
wherein the access-ordered list includes subshards from multiple shards that are ordered by estimated access time without regard to the shard to which each subshard belongs.

6. The method of claim 5, further comprising:
updating stored statistics, indicating dequeue rates for dequeuer-shard pairs of the one or more shards, with an updated dequeue rate for a particular dequeuer-shard pair;
after updating the stored statistics, recomputing the access-ordered list based, at least in part, on the updated dequeue rate.

7. The method of claim 6, wherein:
the particular dequeuer-shard pair comprises a first dequeuer and a first shard that includes a first subshard; and
the dequeue rate for the particular dequeuer-shard pair is updated when the first dequeuer finishes dequeuing the messages in the first subshard or when the first dequeuer begins processing a next subshard of the first shard.

8. The method of claim 6, further comprising:
monitoring, by a background process, dequeue progress by the plurality of dequeuers;
the particular dequeuer-shard pair comprises a first dequeuer and a first shard that includes a first subshard; and
wherein the dequeue rate for the particular dequeuer-shard pair is updated when the background process determines that the first dequeuer has stalled while processing the first subshard.

9. The method of claim 1, further comprising:
maintaining, for the queue, a queue table in secondary storage;
wherein enqueuing the plurality of messages in the current subshard includes storing the particular message in secondary storage by adding the particular message to a row of the queue table within a partition of the queue table that is assigned to the current subshard.

10. The method of claim 1,
wherein the plurality of messages includes an out-of-order message;
wherein generating estimated access time data comprising earliest estimated access times, said earliest estimated access times comprising the earliest estimated access time for each subshard of the plurality of subshards of the queue is further based on a delivery time for the out-of-order message.

11. One or more non-transitory computer-readable media storing one or more sequences of instructions which, when executed by one or more processors, cause:
enqueuing a plurality of messages from a plurality of enqueuers in a queue comprising one or more shards, each shard of the one or more shards comprising one or more subshards;
maintaining, in memory, a message cache configured to store a plurality of cached subshards;
wherein the plurality of messages includes a particular message;
wherein enqueuing the plurality of messages comprises enqueuing the particular message in a current subshard of a particular shard of the one or more shards, wherein enqueuing the particular message in the current subshard includes storing the particular message in a cached subshard corresponding to the current subshard of the particular shard;
wherein each dequeuer-shard pair of a plurality of dequeuer-shard pairs comprises (a) a respective dequeuer of a plurality of dequeuers dequeuing from a respective shard of said one or more shards, and (b) the respective shard;
determining dequeue rates for the plurality of dequeuer-shard pairs by at least determining, for each dequeuer-shard pair of said plurality of dequeuer-shard pairs, a dequeue rate of the respective shard of said each dequeuer-shard pair by the respective dequeuer of said each dequeuer-shard pair;
generating estimated access time data comprising earliest estimated access times, said earliest estimated access times comprising an earliest estimated access time for each subshard of a plurality of subshards of the queue based on the dequeue rates for the plurality of dequeuer-shard pairs;
determining a set of subshards of said queue to store as cached subshards in the message cache based on the earliest estimated access times for the plurality of subshards;
maintaining the set of subshards as cached subshards in the message cache;
while a first subshard, of the plurality of subshards, is being maintained as a cached subshard in the message cache, determining, based on the estimated access time data for the plurality of subshards, that the first subshard will likely not be accessed within a particular timeframe; and
responsive to determining that the first subshard will likely not be accessed within the particular timeframe, evicting the first subshard from the message cache.

12. The one or more non-transitory computer-readable media of claim 11, wherein the one or more sequences of instructions include instructions which, when executed by one or more processors, cause, after evicting a second subshard, of the plurality of subshards, from the message cache:
based on the estimated access time data for the plurality of subshards, determining that the second subshard will be likely accessed within a second timeframe;
responsive to determining that the second subshard will be likely accessed within the second timeframe, prefetching the second subshard to restore the second subshard in the message cache.

13. The one or more non-transitory computer-readable media of claim 11, wherein the one or more sequences of instructions include instructions which, when executed by one or more processors, cause:
maintaining, in secondary storage, a swap table;
when a particular subshard is evicted from the message cache, storing a representation of the particular subshard in a row of the swap table;
when the particular subshard is restored to the message cache, restoring the particular subshard, at least in part, by reading the representation of the particular subshard from the swap table into the message cache.

14. The one or more non-transitory computer-readable media of claim 11, wherein the earliest estimated access time of each subshard is the earliest estimated access time of the subshard by any dequeuer of the plurality of dequeuers and any enqueuer of the plurality of enqueuers.

15. The one or more non-transitory computer-readable media of claim 11, wherein the one or more sequences of instructions include instructions which, when executed by one or more processors, cause:
- generating an access-ordered list of subshards based on the estimated access time data for the plurality of subshards;
- wherein the access-ordered list includes subshards from multiple shards that are ordered by estimated access time without regard to the shard to which each subshard belongs.

16. The one or more non-transitory computer-readable media of claim 15, wherein the one or more sequences of instructions include instructions which, when executed by one or more processors, cause:
- updating stored statistics, indicating dequeue rates for dequeuer-shard pairs of the one or more shards, with an updated dequeue rate for a particular dequeuer-shard pair;
- after updating the stored statistics, recomputing the access-ordered list based, at least in part, on the updated dequeue rate.

17. The one or more non-transitory computer-readable media of claim 16, wherein:
- the particular dequeuer-shard pair comprises a first dequeuer and a first shard that includes a first subshard; and
- the dequeue rate for the particular dequeuer-shard pair is updated when the first dequeuer finishes dequeuing the messages in the first subshard or when the first dequeuer begins processing a next subshard of the first shard.

18. The one or more non-transitory computer-readable media of claim 16, wherein the one or more sequences of instructions include instructions which, when executed by one or more processors, cause:
- monitoring, by a background process, dequeue progress by the plurality of dequeuers;
- the particular dequeuer-shard pair comprises a first dequeuer and a first shard that includes a first subshard; and
- wherein the dequeue rate for the particular dequeuer-shard pair is updated when the background process determines that the first dequeuer has stalled while processing the first subshard.

19. The one or more non-transitory computer-readable media of claim 11, wherein the one or more sequences of instructions include instructions which, when executed by one or more processors, cause:
- maintaining, for the queue, a queue table in secondary storage;
- wherein enqueuing the plurality of messages in the current subshard includes storing the particular message in secondary storage by adding the particular message to a row of the queue table within a partition of the queue table that is assigned to the current subshard.

20. The one or more non-transitory computer-readable media of claim 11,
- wherein the plurality of messages includes an out-of-order message;
- wherein generating estimated access time data comprising earliest estimated access times, said earliest estimated access times comprising the earliest estimated access time for each subshard of the plurality of subshards of the queue is further based on a delivery time for the out-of-order message.

* * * * *

UNITED STATES PATENT AND TRADEMARK OFFICE
CERTIFICATE OF CORRECTION

PATENT NO. : 9,996,404 B2
APPLICATION NO. : 15/254278
DATED : June 12, 2018
INVENTOR(S) : Jaiswal et al.

Page 1 of 1

It is certified that error appears in the above-identified patent and that said Letters Patent is hereby corrected as shown below:

In the Specification

In Column 10, Line 6, delete "shown," and insert -- shown. --, therefor.

In Column 12, Line 52, delete "Implememntation" and insert -- Implementation --, therefor.

In Column 16, Lines 7-8, delete "present," and insert -- present. --, therefor.

In Column 19, Line 2, after "SQL/XML" delete ",".

Signed and Sealed this
Twenty-ninth Day of January, 2019

Andrei Iancu
*Director of the United States Patent and Trademark Office*